United States Patent Office 3,093,398
Patented June 11, 1963

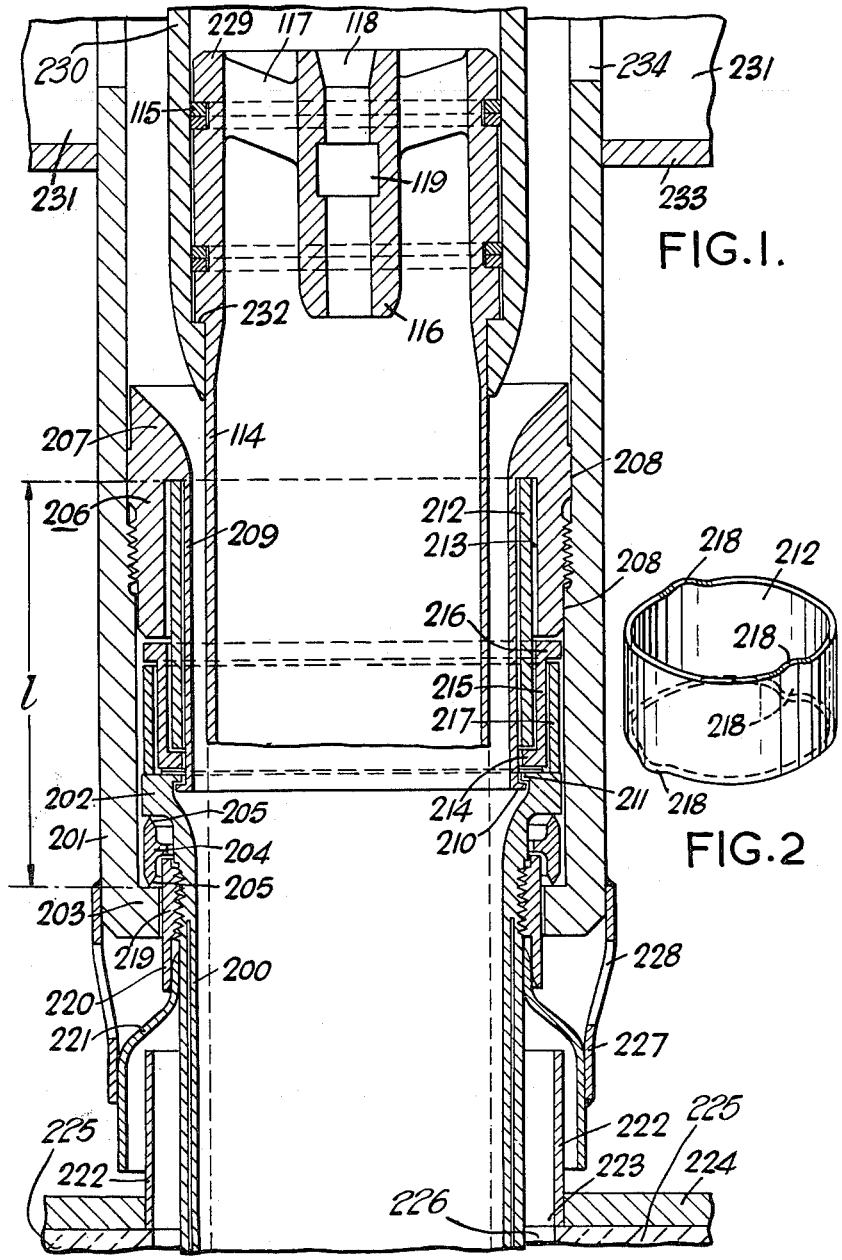

3,093,398
JOINTS BETWEEN TUBES OF DISSIMILAR MATERIALS
Sydney Fawcett, Hale Barnes, and William Rodwell, Culcheth, near Warrington, England, assignors to the United Kingdom Atomic Energy Authority, London, England
Filed June 24, 1958, Ser. No. 744,205
Claims priority, application Great Britain June 24, 1957
2 Claims. (Cl. 285—173)

This invention relates to tube couplings and is concerned with coupling tubes having different thermal expansion characteristics and of different diameter so that the tubes are brought together for coupling by passing the smaller tube through the larger tube. In this arrangement sealing is made between an internal flange on the larger tube and an external flange on the smaller tube. Such an arrangement is required in a sodium cooled graphite moderated nuclear reactor where the larger tube forms part of the structure of the reactor and the smaller tube is a removable structural tube. Sealing between the flanges is effected by a metal ring and a problem exists in that the seal afforded by such an arrangement is unreliable when subjected to thermal cycling due to the different radial and longitudinal thermal expansion characteristics of the two tubes and the metal ring.

The present invention provides a tube coupling having improved sealing characteristics under conditions of temperature variation. According to the invention a tube coupling for coupling a smaller tube to a large tube after passing the smaller tube through the larger tube comprises a metal sealing ring located between an internal flange on the larger tube and an external flange on the smaller tube said sealing ring being of material having a coefficient of thermal expansion intermediate between the coefficients of expansion of the larger and the smaller tubes, means clamping the sealing ring between the external and the internal flange, said means having thermal expansion characteristics such that its thermal expansion together with that of the metal sealing ring and the tubes compensates to stabilise the variation of load in the sealing ring with temperature changes.

One embodiment of the invention will now be described by way of example with reference to the accompanying drawing in which:

FIGURE 1 is a longitudinal section elevation.
FIGURE 2 is a detail of FIGURE 1 is isometric form.

In FIGURE 1 there is shown a double walled zirconium tube 200 connecting with a mild steel tube 201 forming part of the structure of a sodium cooled graphite moderated nuclear reactor. The zirconium tube 200 has an external flange 202 at which it is sealed to the mild steel tube 201 at an internal flange 203. Sealing is effected by a nickel alloy sealing ring 204. The sealing ring 204 has narrow sealing faces, 205 and is clamped between the flanges 202 and 203 by a composite tubular member 206 screwed in the tube 201. The member 206 comprises a tubular body 207 with extended lead faces 208 and an integral internal coaxial sleeve 209. The sleeve 209 has an external flange 210 expanded to underlie an internal lip 211 formed in the tube 200 so that on breaking down the coupling the tube 200 is removable with the member 206. The sealing ring 204 has an internal flange 235 so that on removal of the tube 200 the sealing ring 204 is removed therewith by engagement of the flange 235 with a sleeve 219 screwed externally on the zirconium tube 200. A nickel alloy sleeve 212 is contained within the annular cavity 213 defined between the body 207 and the coaxial sleeve 209. The sleeve 212 bears against an internal end flange 214 of a mild steel sleeve 215 also having an external end flange 216. A second nickel alloy sleeve 217 is held between this flange 216 and the flange 202 of the zirconium tube 200. The sleeves 212, 215 and 217 form a temperature compensating nest of coaxial tubes. As shown in FIGURE 2 the nickel alloy sleeve 212 has upper and lower diametrically opposed end lobes 218 arranged in quadrature. The nickel alloy sleeve 217 has similar end lobes 218 and the lobes 218 provide a balanced loading through the sleeves 212 and 217. The nickel alloy sealing ring and the nickel alloy sleeve 217 have similar thermal expansion characteristics while the nickel alloy sleeve 212 has a higher thermal expansion characteristic. The sleeve 219 screwed externally on the zirconium tube 200 has a part 220 spaced from the tube 200 to provide end location for a hood 221. The hood 221 covers a tube 222 welded around the circumference of a hole 223 in a plate 224 covering graphite blocks 225 forming the core of the reactor and defining fuel element channels 226. A support tube 227 having perforations 228 is seam welded between the mild steel tube 201 and the hood 221.

A tube 114 forming part of a removable fuel element assembly passes coaxially through the tubes 200 and 201. The tube 114 has a head 229 of increased section sealed in a structural tube 230 by piston rings 115 and located longitudinally by an internal step 232 in the tube 230. A tubular boss 116 which is located axially in the tube 114 by integral webs 117 has a bore 118 with a recessed part 119 for engagement of a lifting tool in removal of the tube 114 from the reactor. A sodium header tank 231 is formed with a base plate 233 welded around the tube 201 and in fluid connection therewith through holes 234.

Fluid flow past the coupling of FIGURE 1 is from the header tank 231 down the annular space between the tube 114 and the tubes 201, 200 and thence up through the tube 114 to effect cooling of fuel rods contained within the tube 114. Temperature fluctuations of the sodium arising under different operating conditions give rise to a differential expansion of the tubes 200 and 201 and by choosing suitable dimensions for the sealing ring 204 and the sleeves 212, 215 and 217 the thermal expansion of these members can be made to compensate the differential expansion of the tubes 200 and 201 maintaining a fluid tight seal over a considerable temperature range. If for example the length $l$ (FIG. 1) of the mild steel tube 201 (linear coefficient of thermal expansion approximately $12 \times 10^{-6}/°$ C.) is set at 18 units the length of the nickel alloy sleeve 212 (linear coefficient of thermal expansion approximately $12 \times 10^{-6}/°$ C.), is made 12 units, the length of the mild steel sleeve 215 (linear coefficient of thermal expansion approximately $12 \times 10^{-6}/°$ C.) is made 4 units, excluding the flanges 214 and 216, the length of the nickel alloy sleeve 217 (linear coefficient of thermal expansion approximately $9 \times 10^{-6}/°$ C.) is made 5 units, the depth of the flange 202 (linear coefficient of thermal expansion of zirconium approximately $6 \times 10^{-6}/°$ C.) is made 2 units and the depth of the nickel alloy sealing ring 204 (linear coefficient of thermal expansion approximately $9 \times 10^{-6}/°$ C.) is made 3 units, virtually absolute longitudinal compensation is obtained and a partial radial compensation.

Should however the seal fail, liquid sodium escaping between the internal flange 203 and the sleeve 219 is directed by the hood 221 on to the plate 224 from whence it may be pumped away.

The lead faces 208 of the member 206 provide for correct location of this member 206 prior to screwing down when remote recoupling of the tubes 200 and 201 is performed.

This invention has application to a sodium-graphite reactor such as is disclosed in full detail in a co-pending application No. 744,185 of even date in the names of Everett Long and Ronald Scott Challender, now U.S. Patent No. 3,000,728.

We claim:

1. A tube coupling between a first tube end member forming a fixed part of an apparatus and a second tube end member forming a removal part of said apparatus and inside said first tube end member, the tube end members having different coefficients of thermal expansion, an internal flange on said first tube end member, an external flange on the second tube end member and axially spaced from said internal flange, a sealing ring between said flanges, a clamping ring engaged with an internal thread on said first tube end member and having a radially inwardly extending face, and a nest of coaxial sleeve members alternately in compression and tension, the innermost thereof being in compression as exerted by the face of the clamping ring bearing thereon, and the outermost of said coaxial sleeve members being in contact with said external flange on the second tube end member, each sleeve member in tension having an internal flange at one end bearing against the adjacent member surrounded by the sleeve member in tension and an external flange at the other end bearing against the adjacent member surrounding said sleeve member in tension, said sealing ring having a coefficient of thermal expansion intermediate those of the tube end members and the sum of expansions of members in compression in the coupling approximating the sum of expansions of members in tension.

2. A tube coupling as claimed in claim 1 wherein said clamping ring has an integral tubular part passing inside the nest of sleeve members, said tubular part having a flanged end engaging an internal flanged end of said second tube end member.

References Cited in the file of this patent

UNITED STATES PATENTS

| | | |
|---|---|---|
| 1,680,900 | McQuaid | Aug. 14, 1928 |
| 2,457,073 | Stearns | Dec. 21, 1948 |
| 2,611,238 | Fryer | Sept. 23, 1952 |
| 2,646,997 | Magos et al. | July 28, 1953 |
| 2,927,806 | Lahee | Mar. 8, 1960 |

FOREIGN PATENTS

| | | |
|---|---|---|
| 811,060 | Germany | Aug. 16, 1951 |